United States Patent
Kawana et al.

(10) Patent No.: US 7,026,001 B2
(45) Date of Patent: Apr. 11, 2006

(54) METHOD OF CONCENTRATING PROCESSED VEGETABLE AND FRUIT PRODUCTS BY REVERSE OSMOSIS

(75) Inventors: Takahiro Kawana, Tochigi (JP); Kazuo Kagitani, Tochigi (JP); Katsunobu Sumimura, Tochigi (JP); Kiro Hayakawa, Tochigi (JP)

(73) Assignee: Kagome Kabushiki Kaisha, Aichi (JP)

( * ) Notice: Subject to any disclaimer, the term of this patent is extended or adjusted under 35 U.S.C. 154(b) by 272 days.

(21) Appl. No.: 09/919,170

(22) Filed: Jul. 30, 2001

(65) Prior Publication Data

US 2002/0094365 A1     Jul. 18, 2002

(30) Foreign Application Priority Data

Jan. 16, 2001   (JP)  ............................. 2001-07529

(51) Int. Cl.
    *A23L 1/212*   (2006.01)

(52) U.S. Cl. .................. 426/422; 426/492; 426/495

(58) Field of Classification Search ........... 426/422, 426/492, 495
    See application file for complete search history.

(56) References Cited

U.S. PATENT DOCUMENTS

| | | | | |
|---|---|---|---|---|
| 3,637,081 A | * | 1/1972 | Bradley | 210/110 |
| 3,654,148 A | * | 4/1972 | Bradley | 210/636 |
| 4,900,574 A | * | 2/1990 | Smallwood et al. | 426/330.3 |

FOREIGN PATENT DOCUMENTS

| | | | |
|---|---|---|---|
| DE | 4110943 | * | 10/1992 |
| JP | 52-136942 | * | 11/1977 |

OTHER PUBLICATIONS

Derwent Abstract. Acc. No. 1979-50583B. For SU 623831, published Aug. 1978. Inventor: Milovidov et al.*

* cited by examiner

*Primary Examiner*—Anthony Weier
(74) *Attorney, Agent, or Firm*—Beyer Weaver & Thomas LLP

(57) ABSTRACT

A concentrated vegetable and/or fruit product is obtained by reverse osmosis by a method of first preparing a vegetable and/or fruit product including seeds, epidermis and/or sarcocarp as a solid component, causing it to flow down under a pressured condition to a concentration unit having an inlet, an outlet and tubular membrane modules connected in series such that it is supplied to the tubular membrane modules through a single-axis eccentric screw pump attached to the inlet and discharging a concentrated product from the tubular membrane modules through another single-axis eccentric screw pump which is attached to the outlet.

8 Claims, 1 Drawing Sheet

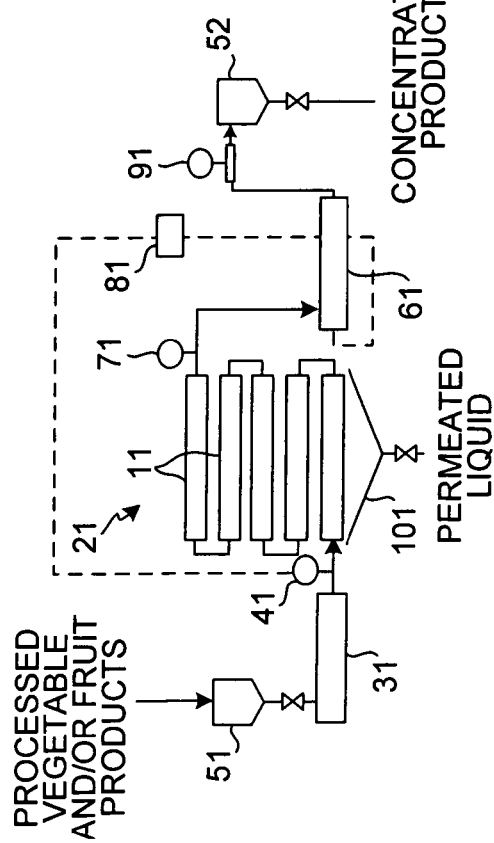
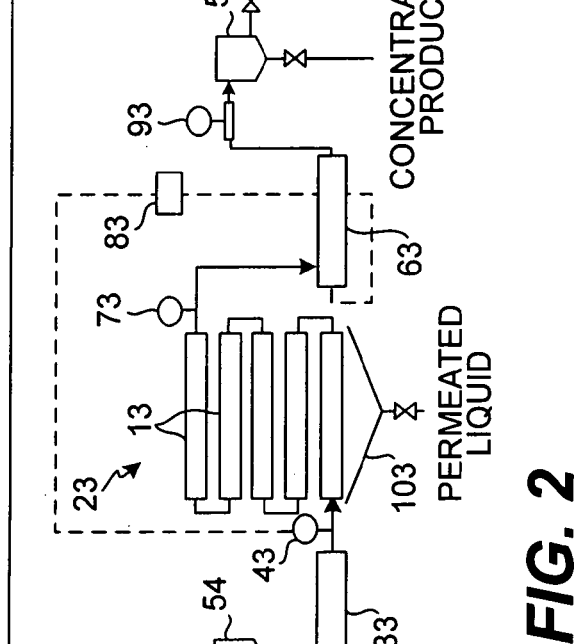
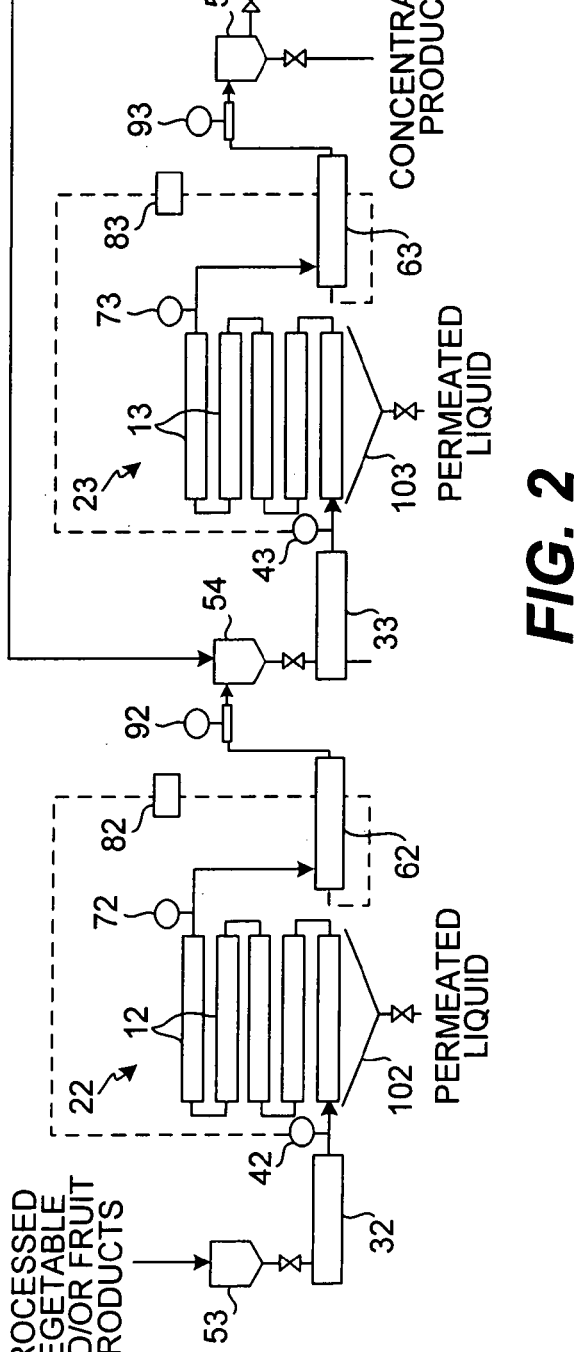
FIG. 1
FIG. 2

METHOD OF CONCENTRATING PROCESSED VEGETABLE AND FRUIT PRODUCTS BY REVERSE OSMOSIS

This application claims priority on Japanese patent application 2001-7529 filed Jan. 16, 2001.

BACKGROUND OF THE INVENTION

This invention relates to a method of concentrating processed vegetable and/or fruit products by reverse osmosis.

Among the means for concentrating squeezed vegetable and/or fruit juice, those by reverse osmosis without involving phase changes are coming to be noted because concentrated products of a higher quality can be obtained by this method than by more commonly practiced methods by heating and evaporation. The present invention relates to improvements in such means for concentration by reverse osmosis.

There are many kinds of conventionally known methods of concentrating vegetable and/or fruit juice by reverse osmosis, including those by causing the squeezed juice to flow through a concentration unit with a plurality of tubular membrane modules connected together by a single-stage single-pass method (as disclosed in Japanese Patent Publications Tokkai 52-136942 and 59-25675), by a multi-stage single-pass method (as disclosed in Japanese Patent Publications Tokkai 5-15351 and 5-336937) and by a multi-stage circulation method (as disclosed in Japanese Patent Publications Tokkai 3-21326 and 3-58774). By the single-stage single-pass method, use is made of only one stage of concentration unit with a plurality of tubular membrane modules connected in series and the squeezed juice is caused to flow through in a single-pass process for reverse osmosis. By the multi-stage single-pass method and the multi-stage circulation method, concentration units each with a plurality of tubular membrane modules connected in series are provided in two or more stages and the squeezed juice is passed through either in a single-pass process or in a circulating process for reverse osmosis.

With any of these prior art means for concentration by reverse osmosis, a high-pressure pump is connected on the inlet side of the concentration unit for supplying the squeezed juice to the tubular modules and a pressure control valve is connected on the exit side of the unit for discharging the concentrated product from the tubular modules, and a plunger pump is usually used as the high-pressure pump. Such prior art means usually have problems of the following four kinds. (1) The use of a plunger pump causes a pulsating motion, thereby disturbing the operating conditions at the time of concentration by reverse osmosis and hence a stable operation cannot be carried out. (2) Because the concentrated product by reverse osmosis under a high-pressure condition (or "pressured condition") is discharged suddenly through the pressure-control valve into an atmospheric condition, the discharged product tends to get scattered. Air is easily absorbed in this process, requiring a troublesome process management for preventing deterioration of product quality and bacterial contamination. (3) In the field of food processing, there are demands for concentrating processed vegetable and/or fruit products which contain solid components such as seeds, surface skin parts (epidermis) and meat parts (sarcocarp) by reverse osmosis but such solid components get stuck easily at the inlet of the plunger pump and the discharge valve as well as the parts of the pressure-control valve with a small clearance. As a practical matter, therefore, it is very difficult to concentrate by reverse osmosis such a processed vegetable and/or fruit product containing solid components. (4) If an attempt is forcibly made to concentrate such a processed vegetable and/or fruit product by reverse osmosis, its solid components are cut or crushed by the plunger pump or the valve parts of the pressure-control valve and hence concentrated products containing the solid components as they existed before the concentration process cannot be obtained.

SUMMARY OF THE INVENTION

It is therefore an object of this invention to provide a method capable of concentrating by reverse osmosis a processed vegetable and/or fruit product containing solid components such that these originally contained solid components keep more or less their original forms.

The present invention is based on the discovery made by the present inventors as a result of their research in view of the object described above that such object can be achieved by connecting a single-axis eccentric screw supply pump on the inlet side of the concentration unit for supplying a processed vegetable and/fruit product and a single-axis eccentric screw discharge pump on its outlet side for discharging a concentrated product by reverse osmosis.

This invention relates to a method of concentrating a vegetable and/or fruit product by reverse osmosis by causing it to flow under a high-pressure condition to a concentration unit with a plurality of tubular membrane modules connected together, characterized by the steps of supplying the vegetable and/or fruit product to the tubular membrane modules through a single-axis eccentric screw pump connected on the inlet side of the concentration unit and discharging it after it has been concentrated by reverse osmosis through another single-axis eccentric screw pump connected on the outlet side of the concentration unit.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic structural diagram of a concentration apparatus by reverse osmosis embodying this invention; and FIG. 2 is a schematic structural diagram of another concentration apparatus by reverse osmosis embodying this invention.

DETAILED DESCRIPTION OF THE INVENTION

An apparatus according to this invention is for concentrating a vegetable and/or fruit product by reverse osmosis by causing it to flow under a high-pressure condition to a concentration unit with a plurality of tubular membrane modules connected together. For the convenience of disclosure, processed products of this kind will be hereinafter referred to as a "vegetable-fruit product". Representative examples of vegetable-fruit product include squeezed juices of vegetables, fruits and their mixtures. The tubular membrane modules are modules having a tubularly shaped semipermeable membrane supported inside a cylindrical body. Commercially available modules of this kind may be used but it is preferable to use a tubular semipermeable membrane with salt rejecting ratio of 90% or greater and it is even more preferable to use such a membrane with salt rejecting ratio of 99% or greater. When a vegetable-fruit product is caused to flow into a concentration unit with a plurality of tubular membrane modules connected together, in a multi-stage single-pass process or a multi-stage circulating process, it is preferable to use a tubular semipermeable membrane with salt rejecting rate 99% or over at least for the concentration unit at the last stage.

As explained above, the vegetable-fruit product may be caused to flow to the concentration unit in a single-stage single-pass process, the multi-stage single-pass process or the multi-stage circulating process but the single-stage single-pass process is preferable for obtaining a concentrated product of a high quality by reverse osmosis in a more stable operation and under an easier process management. By this method, only one stage of concentration unit with a plurality of tubular membrane modules connected together is provided and a vegetable-fruit product is caused to flow into such a single-stage concentration unit in a single-pass process.

An apparatus for concentration by reverse osmosis embodying this invention is characterized as having a single-axis eccentric screw pump connected on its inlet side for supplying a vegetable-fruit product to the tubular membrane modules and another single-axis eccentric screw pump connected on its outlet side for discharging from the tubular membrane modules the vegetable-fruit product which has been concentrated by reverse osmosis. This is in contrast to a prior art apparatus for concentration by reverse osmosis having a plunger pump connected on its inlet side and a pressure control valve on its outlet side.

A single-axis eccentric screw pump is commonly referred to as a Mohno-pump and has been disclosed, for example, in Japanese Patent Publications Tokkai 7-77172, 8-21370 and 9-264264. Mohno-pumps produced, say, by Heishin Engineering & Equipment Co., Ltd. may be used for the purpose of the present invention, comprising a driving mechanism, an inlet part, a pump part and an outlet part, with the pump part provided with a stator and a rotor. The stator is essentially a female screw mainly of an elastic material having a female screw hole with an opening of an elongated circular sectional shape formed continuously in the longitudinal (axial) direction. The rotor is a sectionally circular male screw of a metallic material. The rotor is inserted into the stator, and articles are adapted to be transported thereby as the rotor is rotated around its eccentric axis through the inlet part by the driving mechanism.

The single-axis eccentric screw pump, as described above, includes a connector in the inlet part for communicating the rotary motion of the drive shaft of the driving mechanism to the rotor of the pump part. Many different kinds of such a connector are known, including a coupling rod having universal joints at both its ends, screws, those with elongated stator and rotor for obtaining high discharge pressure and those with two units connected in series. For the purpose of this invention, it is preferable that the single-axis eccentric screw supply pump should have a high discharge pressure and more preferably a discharge pressure greater than 3 MPa.

According to the present invention, a pressure gauge is usually inserted between the single-axis eccentric screw pump for supply on the inlet side of the concentration unit and the tubular membrane modules and another pressure gauge between the single-axis eccentric screw pump for discharge on the outlet side of the concentration unit and the tubular membrane modules such that the numbers of rotation of these pumps are frequency-controlled through an inverter provided with a calculation-control function on the basis of the pressure values measured by these pressure gauges. As an example, the number of rotation of the supply pump may be kept at a constant rate while the number of rotation of the discharge pump may be frequency-controlled through the inverter on the basis of the pressure value measured by the pressure gauge on the outlet side. As another example, the number of rotation of the discharge pump may be kept at a constant rate while the number of rotation of the supply pump may be frequency-controlled through the inverter on the basis of the pressure value measured by the pressure gauge on the inlet side. As still another example, the numbers of rotations of both pumps may be frequency-controlled through their individually corresponding inverters on the basis of the difference between the pressure values measured by the two pressure gauges. In each of these examples, upper and lower limit values are set for each of the pressure gauges such that the numbers of rotations of the pumps can be frequency-controlled within the limits between these upper and lower limit values.

As explained above, single-axis eccentric screw pumps are characterized wherein articles are transported as the rotor of the pump part rotates around its eccentric axis and hence the articles are not likely to be damaged. Since vegetable-fruit products are supplied to the tubular membrane modules according to this invention, no pulsating motion results and hence the operation for the concentration by reverse osmosis can be stabilized. Since the present invention makes use of this favorable characteristic of single-axis eccentric screw pumps to discharge concentrated products gradually from the tubular membrane modules under a high-pressure condition into an atmospheric condition, the discharged products do not scatter around and hence do not absorb air. Thus, the process management becomes easier according to this invention.

An apparatus according to this invention can be used effectively also for concentrating vegetable-fruit products containing solid components such as seeds, peels and fruit meats by reverse osmosis because the single-axis eccentric screw pumps on the inlet and outlet sides are not clogged by such solid components. Since these pumps do not cut or crush such solid components, the solid components originally contained in the vegetable-fruit product remain more or less in their original forms during the process of concentration by reverse osmosis. Even in the case of tomatoes with relatively weak structure, processed tomato products containing seeds, skins and meat parts can be similarly concentrated by reverse osmosis.

A method according to this invention is characterized as using an apparatus as described above to concentrate a vegetable-fruit product by reverse osmosis. When a vegetable-fruit product is concentrated by reverse osmosis by a method of this invention, there is no particular limitation as to the content of solid components but those containing solid components in an amount of 30–60 weight % are suited. Neither is the invention particularly limited in terms of the pressures at the time of concentration by reverse osmosis, it is preferred to operate with the inlet pressure of the concentration unit within the range of 3–5 MPa, the outlet pressure of the concentration unit within the range of 1–3 MPa and under the condition that the pressure difference between the inlet side and the outlet side be greater than 1.5 MPa.

FIG. 1 shows schematically an apparatus embodying this invention, adapted to cause a vegetable-fruit product to flow into a concentration unit by a single-stage single-pass process, having a single stage of concentration unit 21 with a plurality of tubular membrane modules 11 connected in series. Each module 11 supports a tubular semipermeable membrane (not shown) with salt rejecting rate of 99%.

Connected to the inlet side of the concentration unit 21 is the discharge outlet of a supply pump 31 which is a single-axis eccentric screw pump for supplying a vegetable-fruit product to the tubular membrane module 11 on the inlet side. A pressure gauge 41 on the inlet side is provided between the supply pump 31 and the tubular membrane module 11 on the inlet side. The inlet part of the supply pump 31 is connected through a valve to a storage tank 51 into which a vegetable-fruit product is supplied for storage.

Connected to the outlet side of the concentration unit 21 is the suction inlet of a discharge pump 61 which is another single-axis eccentric screw pump for discharging from the tubular membrane modules 11 a vegetable-fruit product which has been concentrated by reverse osmosis inside the concentration unit 21. A pressure gauge 71 on the outlet side is provided between the tubular membrane module 11 on the outlet side and the discharge pump 61. The pressure gauge 41 on the inlet side is connected to an inverter 81 provided with a calculation-control function, and the inverter 81 is connected to the driving mechanism of the discharge pump 61 and serves to frequency-control the number of rotations of the discharge pump 61 on the basis of the pressure value measured by the pressure gauge 41 on the inlet side. The outlet part of the discharge pump 61 is connected through a flow meter 91 to another storage tank 52 for storing vegetable-fruit products which have been concentrated by reverse osmosis.

While the supply pump 31 is rotated at a constant rate and the number of rotations of the discharge pump 61 is frequency-controlled, as explained above, a vegetable-fruit product is supplied to the tubular membrane module 11 on the inlet side from the storage tank 51 successively through the supply pump 31 and the pressure gauge 41 on the inlet side. After it is concentrated by reverse osmosis inside the concentration unit 21 having a plurality of tubular membrane modules 11 connected in series, the concentrated product is stored in the storage tank 52 successively through the tubular membrane module 11 on the outlet side, the pressure gauge 71 on the outlet side, the discharge pump 61 and the flow meter 91. The liquid which permeated through the tubular semipermeable membranes supported by the individual ones of the tubular membrane modules during the concentration process by reverse osmosis in the concentration unit 21 is collected in a receptacle 101 provided at the bottom of the concentration unit 21.

FIG. 2 shows schematically another apparatus embodying this invention characterized as causing a vegetable-fruit product to flow down to a concentration unit for processing by a two-stage circulation process, comprising a first (upstream) concentration unit 22 and a second (downstream) concentration unit 23 which are connected together in series, each having a plurality of tubular membrane modules (respectively 12 and 13) connected in series, such that a portion of the product concentrated by osmosis by the downstream concentration unit 23 is circulated back. Each of the modules 12 and 13 supports a tubular semipermeable membrane (not shown) with salt rejecting rate of 99%.

Connected to the inlet side of the upstream concentration unit 22 is the discharge outlet of a supply pump 32 which is a single-axis eccentric screw pump for supplying a vegetable-fruit product to the tubular membrane module 12 on the inlet side. A pressure gauge 42 on the inlet side is provided between the supply pump 32 and the tubular membrane module 12 on the inlet side. The inlet part of the supply pump 32 is connected through a valve to a storage tank 53 into which a vegetable-fruit product is supplied for storage.

Connected to the outlet side of the concentration unit 22 is the suction inlet of a discharge pump 62 which is another single-axis eccentric screw pump for discharging from the tubular membrane modules 12 a vegetable-fruit product which has been incompletely concentrated by reverse osmosis inside the concentration unit 22. A pressure gauge 72 on the outlet side is provided between the tubular membrane module 12 on the outlet side and the discharge pump 62. The pressure gauge 42 on the inlet side is connected to an inverter 82 provided with a calculation-control function, and the inverter 82 is connected to the driving mechanism of the discharge pump 62 and serves to frequency-control the number of rotations of the discharge pump 62 on the basis of the pressure value measured by the pressure gauge 42 on the inlet side. The outlet part of the discharge pump 62 is connected through a flow meter 92 to another storage tank 54 for storing vegetable-fruit products which have been incompletely concentrated by reverse osmosis.

Connected to the inlet side of the downstream concentration unit 23 is the discharge outlet of a supply pump 33 which is still another single-axis eccentric screw pump for supplying the aforementioned incompletely concentrated vegetable-fruit product to the tubular membrane module 13 on the inlet side. A pressure gauge 43 on the inlet side is provided between the supply pump 33 and the tubular membrane module 13 on the inlet side. The inlet part of the supply pump 33 is connected through a valve to the storage tank 54.

Connected to the outlet side of the concentration unit 23 is the suction inlet of a discharge pump 63 which is still another single-axis eccentric screw pump for discharging from the tubular membrane modules 13 a vegetable-fruit product which has been further concentrated by reverse osmosis inside the concentration unit 23. A pressure gauge 73 on the outlet side is provided between the tubular membrane module 13 on the outlet side and the discharge pump 63. The pressure gauge 43 on the inlet side is connected to an inverter 83 provided with a calculation-control function, and the inverter 83 is connected to the driving mechanism of the discharge pump 63 and serves to frequency-control the number of rotations of the discharge pump 63 on the basis of the pressure value measured by the pressure gauge 43 on the inlet side. The outlet part of the discharge pump 63 is connected through a flow meter 93 to another storage tank 55 for storing vegetable-fruit products which have been further concentrated by reverse osmosis.

Connected to this storage tank 55 through a valve is the suction inlet part of a circulation pump 111 which is still another single-axis eccentric screw pump. The discharge outlet of the circulation pump 111 is connected to the storage tank 54. Thus, a portion of the vegetable-fruit product stored in the storage tank 55 is returned to the tank 54 and processed again through the downstream concentration unit 23 together with the incompletely processed products from the upstream concentration unit 22.

The apparatus of FIG. 2 may be operated by rotating the supply pump 32 at a constant rate and frequency-controlling the number of rotations of the discharge pump 62 while supplying a vegetable-fruit product from the storage tank 53 to the tubular membrane modules 12 successively through the supply pump 32 and the pressure gauge 42 on the inlet side. After it is concentrated preliminarily through the concentration unit 22 with tubular membrane modules 12 connected in series, it is passed successively through the tubular membrane module 12 on the outlet side, the pressure gauge 72 on the outlet side, the discharge pump 62 and the flow rate meter 92 into the storage tank 54. The liquid which permeated through the tubular semipermeable membranes supported by the individual ones of the tubular membrane modules 12 during the concentration process by reverse osmosis in the concentration unit 22 is collected in a receptacle 102 provided at the bottom of the concentration unit 22.

While the supply pump 33 is rotated at a constant rate, the number of rotations of the discharge pump 63 is frequency-controlled, as explained above, and the preliminarily concentrated product (or a mixture of the preliminarily concentrated product and the returned portion from the tank 55) from the storage tank 54 is supplied to the tubular membrane modules 13 on the inlet side successively through the supply pump 33 and the pressure gauge 43 on the inlet side. After it is concentrated by osmosis in the concentration unit 23 with a plurality of tubular membrane unit 13 connected in series, the concentrated product is stored in the tank 55 by successively passing through the tubular membrane module 13 on the outlet side, the pressure gauge 73 on the outlet side, the discharge pump 63 and the flow rate meter 93. If necessary, a portion of the product stored in the tank 55 is returned to the tank 54 by means of the circulation pump 111. The liquid which permeated through the tubular semipermeable membranes supported by the individual ones of the tubular membrane modules 13 during the concentration process by reverse osmosis in the concentration unit 23 is collected in another receptacle 103 provided at the bottom of the concentration unit 23.

In summary, the apparatus shown in FIG. 2 is operated by a two-stage circulating process, causing a vegetable-fruit product to flow down to the upstream concentration unit 22 and to the downstream concentration unit 23 and returning a portion of the concentrated product back to the inlet side of the downstream concentration unit 23 through the circulation pump 111, if necessary. If the circulation pump 111 is omitted, this becomes an apparatus by a two-stage single-pass process.

The invention is described next by way of test and comparison examples.

TEST EXAMPLE 1

The apparatus for a single-stage single-pass process shown in FIG. 1 was used continuously for 5 hours to concentrate a tomato product under the following conditions:

Tomato product: Product processed at 60° C. with concentration 5.0% in Brix scale obtained by peeling, cutting, heating and thereafter crushing tomatoes and containing skins and meat parts as solid components by 35 weight % (the amount of the solid components being the ratio of the residue obtained by passing through a sieve provided with a filter wire with opening diameters of 2.8 mm);
Concentration unit: Unit with total membrane surface area of 10.4 m² having a plurality of tubular membrane modules connected in series, each supporting a tubular semipermeable membrane (AFC99 produced by PCI Inc.);
Supply pump: Mohno-pump 8NES30 produced by Heishin Engineering & Equipment Co., Ltd.;
Discharge pump: Mohno-pump 8NE30 produced by Heishin Engineering & Equipment Co., Ltd.;
Pressure on inlet side of concentration unit: 3.5–4.0 MPa;
Pressure on outlet side of concentration unit: 1.5–2.0 MPa;
Supply rate of vegetable-fruit product to concentration unit: 400 liters/hour;
Discharge rate from concentration unit: 200 liters/hour.

There was no pulsating movement when the tomato product was supplied to the concentration unit and there was no splashing or absorption of air when concentrated product was discharged from the concentration unit. The supply and discharge pumps were not clogged by the solid components and concentrated products by reverse osmosis containing solid components by 65 weight % and with concentration of 10.0% in Brix scale, containing the solid components approximately in the same forms as before the concentration process were obtained. In other words, tomato products containing solid components could be concentrated by reverse osmosis by a stable operation and under an easy process management and processed products containing solid components approximately in their original forms could be obtained.

COMPARISON EXAMPLE 1

Tomato products were condensed intermittently for 5 hours by reverse osmosis in the same manners as in Test Example 1 except a plunger pump was used instead of the single-axis eccentric screw pump as a supply pump, a pressure control valve was used instead of the single-axis eccentric screw pump as the discharge pump and the target inlet and outlet pressures for the concentration unit were set respectively at 3.5–4.0 MPa and 1.5–2.0 MPa. The pulsating motion at the time of supplying the tomato product to the concentration unit was large and there was intense scattering and absorption of air at the time of its discharge from the concentration unit. The plunger pump and the pressure control valve became clogged frequently with the solid components and the apparatus were stopped each time for cleaning. As the concentration operation was continued intermittently, the solid components were cut and/or crushed and a concentrated product containing 20 weight % of solid components not keeping their original forms and concentration of 6.0% in Brix scale was obtained.

TEST EXAMPLE 2

The apparatus for a two-stage circulating process shown in FIG. 2 was used continuously for 5 hours without circulating back the concentrated product discharged from the second concentration unit to concentrate an apple product by a two-stage single-pass process under the following conditions:

Apple product: Product processed at 60° C. with concentration 11.2% in Brix scale obtained by removing peels, seeds and cores from apples, crushing them while sprinkling an aqueous solution containing Vitamin C and thereafter heating and cooling, containing apple meat parts as solid components by 43 weight %;
Concentration unit: With a first unit with total membrane surface area of 7.8 m² having a plurality of tubular membrane modules connected in series, each supporting a tubular semipermeable membrane (AFC99 produced by PCI Inc.) and a second unit with total membrane surface area of 5.2 m² having a plurality of tubular membrane modules connected in series, each supporting a tubular semipermeable membrane (AFC99 produced by PCI Inc.);

Supply pumps: Mohno-pumps 8NES30 (for upstream) and 12NES30 (downstream) both produced by Heishin Engineering & Equipment Co., Ltd.;

Discharge pumps: Mohno-pumps 8NE30 (upstream) and 12NE30 (downstream) both produced by Heishin Engineering & Equipment Co., Ltd.;

Pressure on inlet side of concentration unit: 3.5–4.0 MPa (first stage) and 5.0–6.0 MPa (second stage);

Pressure on outlet side of concentration unit: 2.5–3.0 MPa (first stage) and 3.0–4.0 MPa (second stage);

Supply rate of apple product to concentration unit: 500 liters/hour (first stage) and 350 liter/hour (second stage);

Discharge rate from concentration unit: 350 liters/hour (first stage) and 240 liter/hour.

There was no pulsating movement when the apple product and the product processed in the first stage were supplied to the concentration units and there was no splashing or absorption of air when concentrated product was discharged from the concentration units. The supply and discharge pumps were not clogged by the solid components and concentrated products by reverse osmosis containing solid components by 60 weight % and with concentration of 18.1% in Brix scale, containing the solid components approximately in the same forms as before the concentration process were obtained. In other words, apple products containing solid components could be concentrated by reverse osmosis by a stable operation and under an easy process management and processed products containing solid components approximately in their original forms could be obtained.

COMPARISON EXAMPLE 2

Apple products were condensed intermittently for 5 hours by reverse osmosis in the same manners as in Test Example 2 except a plunger pump was used instead of each of the single-axis eccentric screw pumps serving as a supply pump, a pressure control valve was used instead of each of the single-axis eccentric screw pumps serving as the discharge pump and the target inlet and outlet pressures for the concentration unit were set respectively at 3.5–4.0 MPa and 2.5–3.0 MPa (first stage) and 5.0–6.0 MPa and 3.0–4.0 MPa (second stage). The pulsating motion at the time of supplying the apple product and processed product to the concentration units was large and there was intense scattering and absorption of air at the time of its discharge from each concentration unit. The plunger pumps and the pressure control valves became clogged frequently with the solid components and the apparatus were stopped each time for cleaning. As the concentration operation was continued intermittently, the solid components were cut and/or crushed and a concentrated product containing 30 weight % of solid components not keeping their original forms and concentration of 15.0% in Brix scale was obtained.

TEST EXAMPLE 3

The apparatus for a two-stage circulating process shown in FIG. 2 was used continuously for 5 hours without circulating back the concentrated product discharged from the second concentration unit to concentrate a strawberry product by a two-stage single-pass process under the following conditions:

Strawberry product: Product with concentration 8.5% in Brix scale obtained by removing stems from strawberries and thereafter crushing them, containing seeds and meat parts as solid components by 28 weight %;

Concentration unit: With a first unit with total membrane surface area of 5.2 m$^2$ having a plurality of tubular membrane modules connected in series, each supporting a tubular semipermeable membrane (AFC99 produced by PCI Inc.) and a second unit with total membrane surface area of 5.2 m$^2$ having a plurality of tubular membrane modules connected in series, each supporting a tubular semipermeable membrane (AFC99 produced by PCI Inc.);

Supply pumps: Mohno-pumps 8NES30 (for upstream) and 12NES30 (downstream) both produced by Heishin Engineering & Equipment Co., Ltd.;

Discharge pumps: Mohno-pumps 8NE30 (upstream) and 12NE30 (downstream) both produced by Heishin Engineering & Equipment Co., Ltd.;

Pressure on inlet side of concentration unit: 3.5–4.0 MPa (first stage) and 5.0–6.0 MPa (second stage);

Pressure on outlet side of concentration unit: 2.5–3.0 MPa (first stage) and 3.0–4.0 MPa (second stage);

Supply rate of apple product to concentration unit: 500 liters/hour (first stage) and 400 liter/hour (second stage);

Discharge rate from concentration unit: 400 liters/hour (first stage) and 300 liter/hour.

There was no pulsating movement when the strawberry product and the product processed in the first stage were supplied to the concentration units and there was no splashing or absorption of air when concentrated product was discharged from the concentration units. The supply and discharge pumps were not clogged by the solid components and concentrated products by reverse osmosis containing solid components by 35 weight % and with concentration of 14.2% in Brix scale, containing the solid components approximately in the same forms as before the concentration process were obtained. In other words, strawberry products containing solid components could be concentrated by reverse osmosis by a stable operation and under an easy process management and processed products containing solid components approximately in their original forms could be obtained.

COMPARISON EXAMPLE 3

Strawberry products were condensed intermittently for 5 hours by reverse osmosis in the same manners as in Test Example 3 except a plunger pump was used instead of each of the single-axis eccentric screw pumps serving as a supply pump, a pressure control valve was used instead of each of the single-axis eccentric screw pumps serving as the discharge pump and the target inlet and outlet pressures for the concentration unit were set respectively at 3.5–4.0 MPa and 2.5–3.0 MPa (first stage) and 5.0–6.0 MPa and 3.0–4.0 MPa (second stage). The pulsating motion at the time of supplying the strawberry product and processed product to the concentration units was large and there was intense scattering and absorption of air at the time of its discharge from each concentration unit. The plunger pumps and the pressure control valves became clogged frequently with the solid components and the apparatus were stopped each time for cleaning. As the concentration operation was continued intermittently, the solid components were cut and/or crushed and a concentrated product containing 20 weight % of solid components not keeping their original forms and concentration of 12.0% in Brix scale was obtained.

The disclosure given above makes it clear that the present invention makes it possible to concentrate even vegetable and/or fruit products containing solid components by osmosis such that concentrated product containing solid components approximately in their original forms can be obtained.

What is claimed is:

1. A method of concentrating a vegetable and/or fruit product by reverse osmosis, said method comprising the steps of:
   preparing a vegetable and/or fruit product that includes at least one selected from a group consisting of fruits and vegetables and at least one solid component selected from the group consisting of seeds, epidermis and sarcocarp;
   causing said vegetable and/or fruit product to flow down under a pressured condition to a concentration unit which comprises an inlet, an outlet and a plurality of tubular membrane modules connected in series;
   supplying said vegetable and/or fruit product to said tubular membrane modules through a single-axis eccentric screw pump which is attached to said inlet; and
   discharging a concentrated product from said tubular membrane modules through another single-axis eccentric screw pump which is attached to said outlet.

2. The method of claim 1 wherein said vegetable and/or fruit product is caused to flow into said concentration unit in a single-pass process.

3. The method of claim 1 wherein said vegetable and/or fruit product contains said solid component in an amount of 30–60 weight %.

4. The method of claim 2 wherein the vegetable-fruit product contains said solid component in an amount of 30–60 weight %.

5. The method of claim 3 wherein said reverse osmosis is carried out with pressure of 3–5 MPa at said inlet, pressure of 1–3 MPa at said outlet and pressure.

6. The method of claim 4 wherein said reverse osmosis is carried out with pressure of 3–5 MPa at said inlet, pressure of 1–3 MPa at said outlet and pressure difference greater than 1.5 MPa between said inlet and said outlet.

7. The method of claim 5 wherein said vegetable and/or fruit product is a processed tomato product.

8. The method of claim 6 wherein said vegetable and/or fruit product is a processed tomato product.

* * * * *